United States Patent
Derouault et al.

(10) Patent No.: US 7,922,478 B2
(45) Date of Patent: Apr. 12, 2011

(54) CONTROL DEVICE USING A FOLLOWER MEMBER AND A CAM PATH TO CONTROL AN ELEMENT OF A MACHINE FOR PROCESSING CONTAINERS, AND A CONTAINER PROCESSOR MACHINE INCLUDING SUCH A DEVICE

(75) Inventors: Philippe Derouault, Octeville-sur-Mer (FR); Laurent Danel, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 421 days.

(21) Appl. No.: 12/097,357

(22) PCT Filed: Dec. 15, 2006

(86) PCT No.: PCT/FR2006/002742
§ 371 (c)(1),
(2), (4) Date: Jun. 13, 2008

(87) PCT Pub. No.: WO2007/080272
PCT Pub. Date: Jul. 19, 2007

(65) Prior Publication Data
US 2009/0011069 A1    Jan. 8, 2009

(30) Foreign Application Priority Data
Dec. 16, 2005 (FR) ..................... 05 12862

(51) Int. Cl.
*B29C 49/56* (2006.01)
*B29C 49/42* (2006.01)

(52) U.S. Cl. ........ 425/541; 74/567; 425/540; 425/451.4; 425/DIG. 5

(58) Field of Classification Search .................. 425/540, 425/541, 451.4, DIG. 5; 74/567
See application file for complete search history.

(56) References Cited

U.S. PATENT DOCUMENTS

| | | | |
|---|---|---|---|
| 5,195,565 A | 3/1993 | Owen et al. | |
| 5,528,879 A | 6/1996 | Louy et al. | |
| 7,140,871 B2 * | 11/2006 | Evrard | ........................ 425/540 |
| 2004/0255715 A1 * | 12/2004 | Evrard | ........................ 74/567 |

FOREIGN PATENT DOCUMENTS

| | | |
|---|---|---|
| DE | 200 06 524 U1 | 6/2000 |
| DE | 101 10 668 A1 | 9/2002 |
| DE | 102 46 685 A1 | 4/2004 |
| EP | 0 537 023 A1 | 4/1993 |

OTHER PUBLICATIONS

English translations of International Search Report and Written Opinion.

* cited by examiner

*Primary Examiner* — Robert B Davis
(74) *Attorney, Agent, or Firm* — Sughrue Mion, PLLC

(57) ABSTRACT

A control device using a follower member and a cam path to control an element of a container processor machine, the device comprising two cam paths defined by a single rigid assembly (5), means enabling relative movement between the follower member and the rigid assembly (5), between at least two positions, the follower member engaging a first cam path in a first position and engaging a second cam path in a second position. A blow-molding or stretch blow-molding machine including such a device, in particular for controlling the movement of the lengthening rod, or for controlling mold locking/unlocking, or for controlling mold opening/closing.

11 Claims, 4 Drawing Sheets

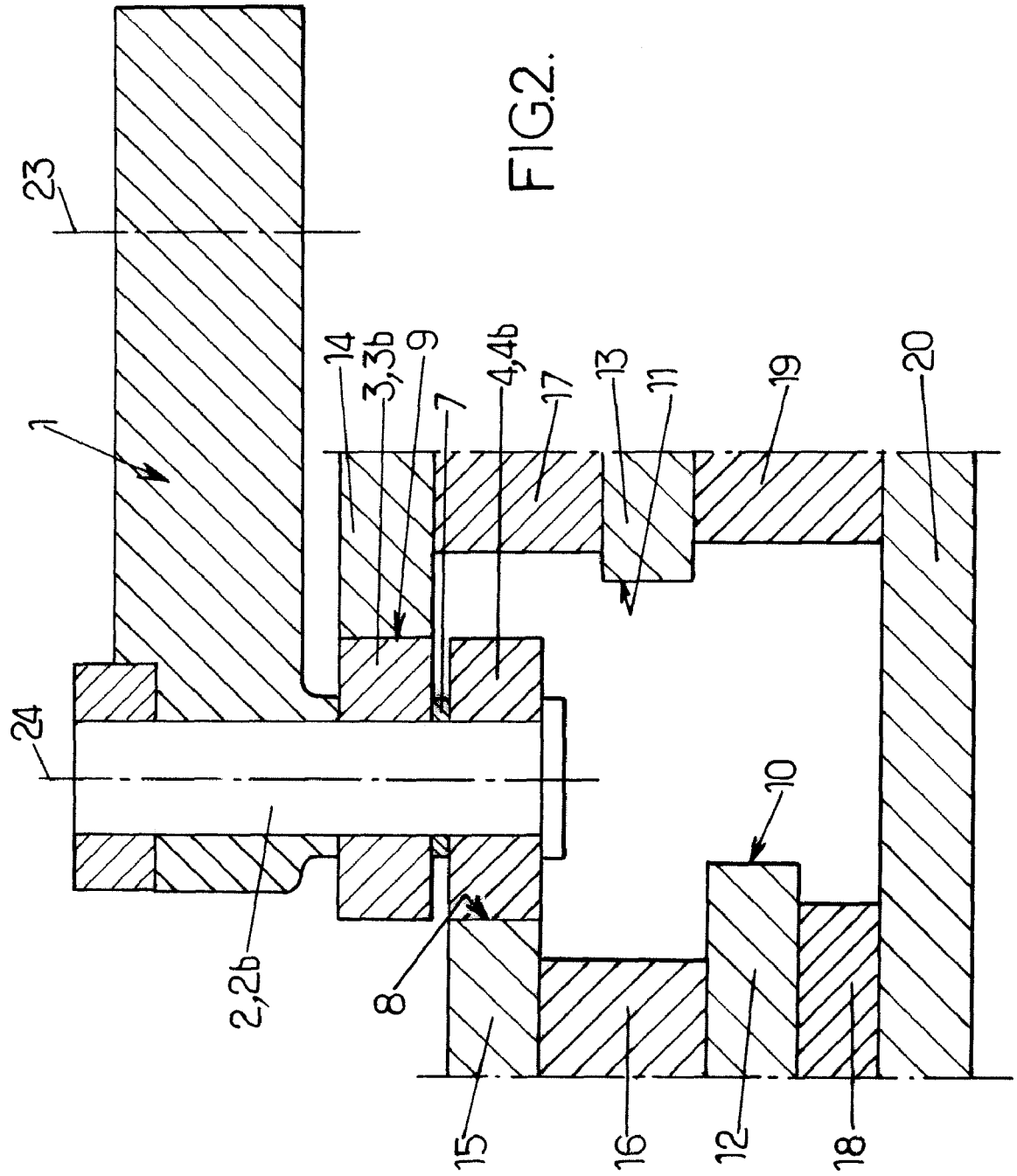

CONTROL DEVICE USING A FOLLOWER MEMBER AND A CAM PATH TO CONTROL AN ELEMENT OF A MACHINE FOR PROCESSING CONTAINERS, AND A CONTAINER PROCESSOR MACHINE INCLUDING SUCH A DEVICE

FIELD OF THE INVENTION

The present invention relates in general to the field of processing containers. It applies more particularly but not exclusively:

to fabricating containers out of thermoplastic material, such as polyethylene terephthalate (PET) or polyethylene naphhalte (PEN), in particular by blow-molding or stretch blow-molding process starting from a blank; and to filling all types of container.

The invention relates in particular to processor machines of the rotary type.

Thus, with blow-molding or stretch blow-molding machines, the invention relates more particularly to those having a plurality of blow-molding stations mounted on the periphery of a carousel that is driven to rotate continuously about its axis. Each blow-molding station includes in particular a blow-molding mold, a blower device, and a stretcher device.

With filling machines, the invention relates more particularly to those having a plurality of filling stations mounted at the periphery of a carousel that is driven to rotate continuously about its axis. Each filling station includes in particular a filling head under which a container is placed. Each filling station includes moving members, such as valves in each head, or members enabling the head to be moved relative to the containers (e.g. to bring the container close to the filler orifice of the head, or to press it thereagainst).

BACKGROUND OF THE INVENTION

Definitions of Certain Terms Used

The definitions below are given solely for reasons of clarity.

These definitions are relative to the vocabulary commonly used in the professions involved by the present invention.

The abbreviation PET stands for poly(-ethylene terephthalate), i.e. a polyester obtained for example by polycondensation, e.g. from terephthalatic acid and ethylene glycol.

The abbreviation PEN stands for poly(-ethylene naphthalate). This is also a polyester.

The term blank is used to designate a preform or an intermediate container.

A preform is generally a substantially tubular object that is closed at one axial end and the opening of which has the final shape for the neck of the final hollow body, such as a bottle or a flask.

Blow-molding designates a process in which the blank is placed in a finishing mold housing the cavity matching the container that is to be obtained, with a blow nozzle (or blow-pipe) being inserted into the opening (the neck) of the blank, a blow fluid under pressure pressing the material of the blank against the walls of the mold. The finishing mold is for example of the wallet type, i.e. that comprises two portions that open by pivoting apart about a common axis. The blow fluid is generally air.

Stretch blow-molding designates a process in which a lengthening rod (also named cane) stretches the preform in the blow mold, by pressing against the end wall of the preform. Such a process is used in particular for blowing previously-injected preforms, with stretching (or lengthening) being performed before or during blowing of the preform. When stretching precedes blowing, pre-blowing is generally performed, in particular in order to avoid material collapsing onto the lengthening rod.

Prior to stretch blow-molding, preforms of thermoplastic material are heated in a conditioning oven so as to be raised to a temperature above the glass transition temperature of the thermoplastic material.

The term stretch blow-molding is used herein also to cover a process in which a lengthening rod is used to stretch an intermediate container. Such a process is used in double blow-molding machines.

Cam Controlling Movements of Members of the Machine

In container-processing machines, the control of movements of functional members of the machine is conventionally provided with the help of rolling members (typically rollers) running along cams.

That is the case in particular in stretch blow-molding machines for controlling the opening/closing of the mold, for controlling the locking/unlocking of the mold, for raising and lowering the lengthening rod, for moving the arms for transferring preforms or bottles.

That is also the case in certain filling machines for controlling the opening of filling heads associated with each filling station, or for moving heads relative to containers to be filled, in particular to move them closer together, or to press one against the other for sealing purposes, or to move the containers away from the filling orifice of a valve.

Generally, the rolling members are carried by the processing stations and the cams are mounted on the frame of the machine.

The presence of such rolling member and cam devices allows to ensure a perfect repetitiveness of the processing steps from one station to another.

Container Fabrication Machines
Cam Controlling the Movements of the Lengthening Rod The control of the axial lengthening rate is of great importance for quality for the blown product. It is also appropriate to synchronize the movement of the stretch rod with the triggering of blowing. It is therefore necessary to control the movements of the lengthening rod. This control is critical, in particular for present-day stretch blow-molding machines which have very high rates of throughput.

Conventionally, the stretching rate is controlled by means of a roller and cam device placed in the top portion of the machine. This device is so conventional that is it often not even shown (see for example document FR 2 863 929 of the Applicant).

This roller and cam device seeks to synchronize the axial position of the lengthening rod as a function of the angular position of said blow-molding station about the axis of rotation of the carousel.

Document FR 2 814 392 of the Applicant shows a conventional configuration for such roller and cam control device.

The prior art machine shown in FIG. 1 of document FR 2 814 392 is a rotary machine: it has a plurality of stretch blow-molding stations mounted on a carousel. The carousel is driven to rotate continuously about its axis A1. Each stretch blow-molding station comprises a blow mold, a blow nozzle, a stretching rod, a slider, a rail, and means for controlling the movements of the stretching rod. The rods are fastened at their top ends to the slide which can vertically slide on the rail mounted on the carousel. Each blow station includes a single-acting pneumatic jack subjected to on/off control, this jack acting on the slider to cause it to slide axially downwards.

The rate of stretching is controlled by a control cam which is carried by the frame of the machine and extends helically around the axis A1 of the carousel. The slider comprises a roller which, under drive from the jack, is pressed against said cam. In general, a safety cam is provided that is analogous to the control cam but that is configured to force the rod to return towards its retraction position if the roller comes into contact therewith. The safety cam allows to ensure that the rod is disengaged from the mold when it is desired to eject the container at the end of molding in the event of the jack for raising the rod failing to operate, for example as a result of a fluid flow problem.

Document FR 2 863 928 of the Applicant also shows another configuration for controlling the movement of the stretching rod, by a roller and cam control mechanism. Two superposed circular stationary control cams define, on respective inside faces, running surfaces for two rocker rollers. Those running surfaces are provided with bumps. The run of the rollers over these bumps cause the rocker to turn. A compass mechanism transforms the turning movement of the rocker into vertical linear reciprocating motion of the stretching rod.

Cam for Controlling Mold Opening/Closing and Locking/Unlocking

Document FR 2 737 436 of the Applicant shows an embodiment for controlling through a cam the opening and closing of a mold of the wallet type with two half shells. A follower roller engages a gutter-shaped cam, this cam being shaped so as to determine four successive functional limits in the positioning of an actuator arm:
  beginning of mold opening;
  end of mold opening;
  beginning of mold closure;
  end of mold closure.

These successive positions limit the following periods that are characteristic of the process and that determine the quality of the product obtained: time during which a finished container can be extracted from the mold; time during which a preform can be inserted into the mold; and blowing or stretch-blowing time.

Document FR 2 653 058 of the Applicant shows an embodiment for controlling through a cam the opening/closing of a mold of the wallet type, as well as the locking/unlocking of that mold.

Cam for Controlling the Movement of Transfer Members

Document FR 2 479 077 describes one possible arrangement of a rotary clamp having a complex motion of rotation and radial displacement under drive from a cam. This clamp takes hold of hot preforms at the outlet of the oven and brings them into the open mold.

The movements of such transfer clamps depend on the movements of molds opening and closing.

Filling Machines
Cam for Controlling the Movements of Valves in Filling Heads

Control over the speed or the amplitude of the movements of valves or equivalent members in a filling head can be of the utmost importance in achieving proper filling. In particular, it is important to control the rate of filling: thus, it is known to begin the filling stage at a high rate and to finish it off at a slower rate in order to absorb any foam that might have formed while filling at a high rate. It is also appropriate to synchronize the movement of the valves with the container being positioned under the orifice of the filling head. It is therefore necessary to control movement of valves. In certain types of filling devices, valve movement is dependent on the movement of a roller which follows a guide cam. Such control is critical, in particular in present-day filling machines that have very high rates of throughput.

Cam Controlling the Relative Movements of Containers and Filling Heads

Control over the relative movements of containers and filling heads can be of the utmost importance in obtaining proper filling. As mentioned, it is also appropriate to synchronize the movement of the valves with the positioning of the container under the orifice of the filling head. It is therefore necessary to control the relative movements of containers (in particular vertically movable transfer clamps) and of heads (or of certain moving members in heads), in order to ensure a proper positioning of containers and filler orifices.

Technical Problems Identified by the Applicant

The Applicant has identified an unstated desire of certain users to have machines that make it possible to implement not one single, particular process, but two or more fabrication process.

From document U.S. Pat. No. 5,528,879 it is known to provide a control device, using a follower member and a cam path, for controlling an element of a container processing machine, that control device having two cam paths defined by a single rigid assembly, as well as means allowing to ensure a relative offsetting between the follower member and the rigid assembly between at least two positions, the follower member engaging a first cam path in a first position, the follower member engaging a second cam path in a second position. Nevertheless, the control device described in document U.S. Pat. No. 5,528,879 does not enable two distinct types of control to be obtained. The same is true for the devices of documents EP 0 537 023, DE 102 46 685, and DE 200 06 524.

Indeed the Applicant has identified in particular the unstated desire of a small number of users to have container manufacturing machines that enable them to manufacture containers out of PET suitable for hot-filling as well as containers out of PET not suitable for hot-filling.

PET containers obtained by stretching and blow-molding a preform raised to the PET bi-orientation temperature have, when being raised to a temperature higher than the glass transition temperature Tg, an important shrinkage, connected to releasing residual stresses generated in the material during bi-orientation (longitudinal stretching, then blowing causing transverse stretching).

In order to improve the thermal stability of PET bottles, a thermal treatment known as thermofixing is conventionally performed.

Several thermofixing processes have been described. For example, the walls of the mold are raised to a temperature 40° C. higher than the minimum orientation temperature, then the container, maintained for several seconds under pressure against the walls of the mold, is cooled.

Once a blow-molding or stretch blow-molding manufacturing machine has been designed and built for manufacturing conventional PET bottles, it is particularly tedious to modify that machine in order to make it suitable for fabricating other bottles, such as PET bottles suitable for hot filling for example.

The Applicant has on another hand identified, particularly, an unexpressed desire of a small number of users to have filling machines enabling containers of different volumes to be filled, or to be filled with products that do not have the same flow characteristics, thus requiring the sequencing and the respective durations of the various filling steps to be adapted.

In particular, the control cams designed for given movements of the members (molds, lengthening rod, clamps, valves, . . . ), movements which are specific to the process, become unusable and need to be changed.

These control cams, machined to within one-hundredth of a millimeter, need to be placed on the machine with very great accuracy.

As a result, conventional machines are, in practice, modified only very exceptionally.

In spite of this unfavorable context, the Applicant seeks to mitigate the above-mentioned drawbacks.

SUMMARY OF THE INVENTION

For these purposes, according to a first aspect, the invention relates to a control device, with a follower member and a cam path, for an element of a container-processing machine, this device comprising two cam paths defined by a single rigid assembly, as well as means enabling a relative movement to take place between the follower member and the rigid assembly, between at least two positions, the follower member engaging a first cam path in a first position, the follower member engaging a second cam path in a second position, the follower member comprising two rollers carried by a common support shaft, the first and second rollers engaging respectively first and second cam paths in a first position of the common support shaft relative to the rigid assembly, the first and second rollers engaging respectively third and fourth cam paths in a second position of the shaft relative to the rigid assembly.

In various embodiments, the device has the following features, where appropriate in combination:
- the rigid assembly defining the cam paths is stationary, and the common support shaft is movable;
- the rigid assembly defining the cam paths is movable, and the common support shaft is stationary;
- the rigid assembly is formed by assembling together segments carrying the cam paths for the follower member, and intermediate segments;
- the rigid assembly is generally in the form of a gutter, with a bottom wall and two flanges, each of the two flanges supporting at least one cam path;
- the device comprises two rigid assemblies, each having a gutter shape, the openings of the two rigid assemblies facing each other, each of the first and second rollers engaging a cam path of each rigid element, both in the first position and in the second position;
- the rigid assembly has a gutter shape with a lateral opening, the rollers being mounted on a shaft on either side of an arm, this arm being mounted to move between a first extreme position in which the arm is closer to a first side edge of the opening of the gutter, and a second extreme position in which the arm is closer to a second side edge of the opening;
- the rigid assembly has a gutter shape with an opening substantially perpendicular to the axis of rotation of the rollers, the roller supporting shaft being removably mounted on a support arm, a short first shaft ensuring that the first and second rollers engage respectively a first cam path and a second cam path of the rigid assembly, a long second shaft ensuring that the first and second rollers engage respectively a third cam path and a fourth cam path of the rigid assembly;
- the follower member includes two or more than two substantially identical rollers.

According to a second aspect, the invention relates to a blow-molding or stretch blow-molding machine including at least one device as set out above, in particular for controlling the movement of lengthening rods, or for controlling mold locking/unlocking, or for controlling mold opening/closing.

According to a third aspect, the invention relates to a machine for filling containers, including at least one device as set out above, in particular for controlling the opening and/or closing of filling members, or for controlling movements of filling heads, or for controlling movements of containers.

LIST OF ACCOMPANYING FIGURES

The invention can be better understood on reading the following detailed description of certain presently-preferred embodiments given purely by way of non-limiting illustration.

In this description, reference is made to the accompanying drawings, in which:

FIG. 2 is a view of the double pair of cams shown in FIG. 1, a short roller carrier being shown in that FIG. 2, the rollers engaging the second pair of cams;

DETAILED DESCRIPTION OF EMBODIMENTS

Figure 1:
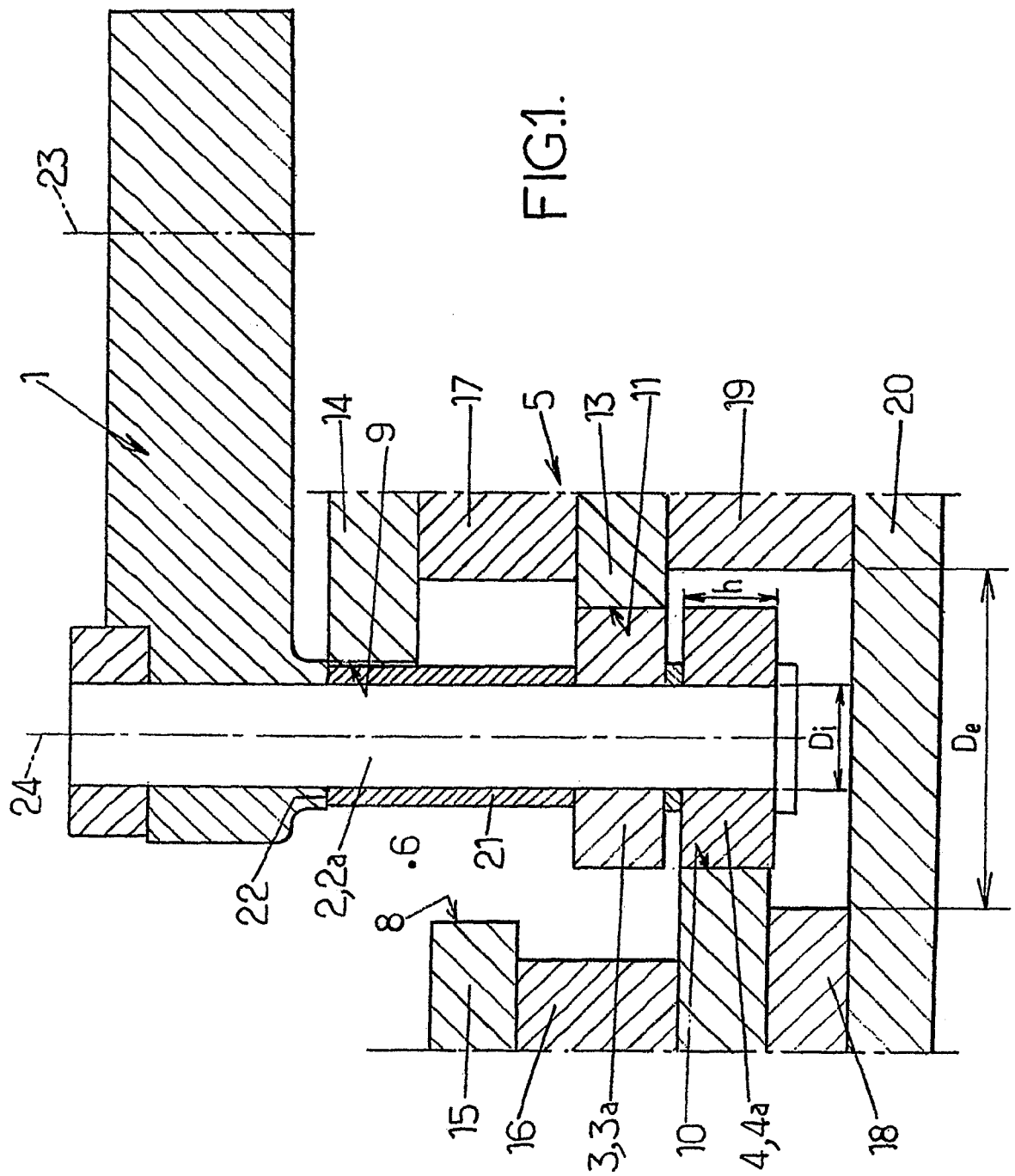
FIG. 1 is a cross-section view of a double pair of cams, according to an embodiment of the invention, a long roller carrier being shown in that FIG. 1, the rollers engaging a first pair of cams.

Reference is made initially to FIGS. 1 and 2 which show a first embodiment.

These FIGS. 1 and 2 show an arm 1 carrying, at one of its ends, a common support shaft 2 on the end portion of which two follower rollers 3, 4 or idler rollers are mounted.

In the embodiment shown, the two rollers 3, 4 are substantially identical. In other embodiments, not illustrated, the rollers 3 and 4 have different outside diameters De, and/or different heights h, and/or different inside diameters Di.

In the embodiment shown, the two rollers 3, 4 are mounted at an end of the shaft 2 that is towards the bottom in the Figures, an assembly 5 defining a double pair of cams generally gutter shaped having an opening 6 that faces upwards in FIGS. 1 and 2. Nevertheless, it should be understood that the device shown in FIGS. 1 and 2 could be the other way up, with the opening of the assembly 5 facing downwards, the shaft 2 entering into the assembly 5 in an upward direction.

The two rollers 3 and 4 are spaced apart from each other by a spacer or ring 7.

The rigid assembly 5 defining the double pair of cams is rigid. With rigid, it is herein mentioned that the positions of the cam paths 8, 9, 10, 11 in this assembly 5 are predetermined.

Advantageously, as can be seen in the figures, the assembly 5 is made up of an assembly of segments 12, 13, 14, 15 carrying the cam paths 8, 9, 10, 11 and other intermediate segments 16, 17, 18, 19 and a base segment 20, such that the assembly has a general gutter shape, with a bottom wall, constituted by the base segment 20, and two flanges, each of the two flanges supporting at least one of the cam paths (each of the two flanges supports two cam paths in the examples shown).

This construction has numerous advantages:
- only the segments carrying the cam paths need to be subjected to fine machining, e.g. to within one-hundredth of a millimeter, the pieces to be machined being relatively lightweight. By selecting thicknesses for the intermediate segments 16, 17, 18, 19 only, it is possible to form a variety of rigid assemblies 5;

where appropriate, the assembly 5 will need have only two cam paths and not four, e.g. the two cam paths 9, 11 in the right-hand portion of the assembly 5;

when an existing machine is provided with a shaft carrying rollers of the type shown in FIGS. 1 and 2, to put the assembly 5 into place is easier, without necessarily changing the existing roller-support shafts. Providing the assembly 5 by assembling together elements enables it to be fitted to existing machines.

As can be seen in FIGS. 1 and 2 when considered together, the common shaft 2 supporting rollers 3, 4 can occupy two determined extreme positions. In a first position (FIG. 1), a first shaft 2a is of a length such that the rollers 3a, 4a engage the two lower cam paths 10, 11. In a second position, a second shaft 2b, different from the first shaft 2a, is of a length such that the rollers 3b, 4b engage the two upper cam paths 8, 9. In the embodiment shown, the rollers 3a, 4a carried by the first shaft 2a are substantially identical to the rollers 3b, 4b carried by the second shaft 2b. In other embodiments, not shown, the rollers 3b, 4b carried by the second shaft 2b have outside diameters De, and/or height h, and/or inside diameters Di that are different from those of the rollers 3a, 4a carried by the first shaft 2a.

A spacer 21 is mounted on the long shaft 2a between the upper roller 3a and an annular abutment 22. That spacer 21 is placed with minimum clearance from the cam path that is the closest thereto. As an indication, this clearance is of one millimeter order.

In the embodiment shown, the arm 1 is mounted to turn about an axis 23, substantially parallel to the axis of rotation 24 of the rollers. That axis of rotation 23 is at a constant distance from the axis of rotation 24 of the rollers.

The assembly 5 is put into place on the machine with the care that is usual in fastening a cam path on a machine (e.g. identifying positions with a comparator, making use of positioning pegs). Once the assembly has been put into place on the machine, it suffices to change the roller support shaft when modifying the process, the short shaft 2b that follows the cam paths 8, 9 corresponding to a first process, and the long shaft 2b that follows the cam paths 10, 11 corresponding to a second process independent of the first. Changing the roller-carrier shaft does not require any particular adjustment and can be performed quickly by staff with relatively little training.

It should also be observed that instead of using shafts 2a, 2b of different lengths, a single long shaft could be present at each workstation, which shaft can occupy two different fixed positions, one corresponding to that of FIG. 1 and the other to that of FIG. 2.

Such an offsettable shaft having two positions, a high one and a low one, mounted on a non-offsettable arm thus makes it possible to change the cam paths followed by the rollers, with the assembly 5 being stationary.

Figure 4:
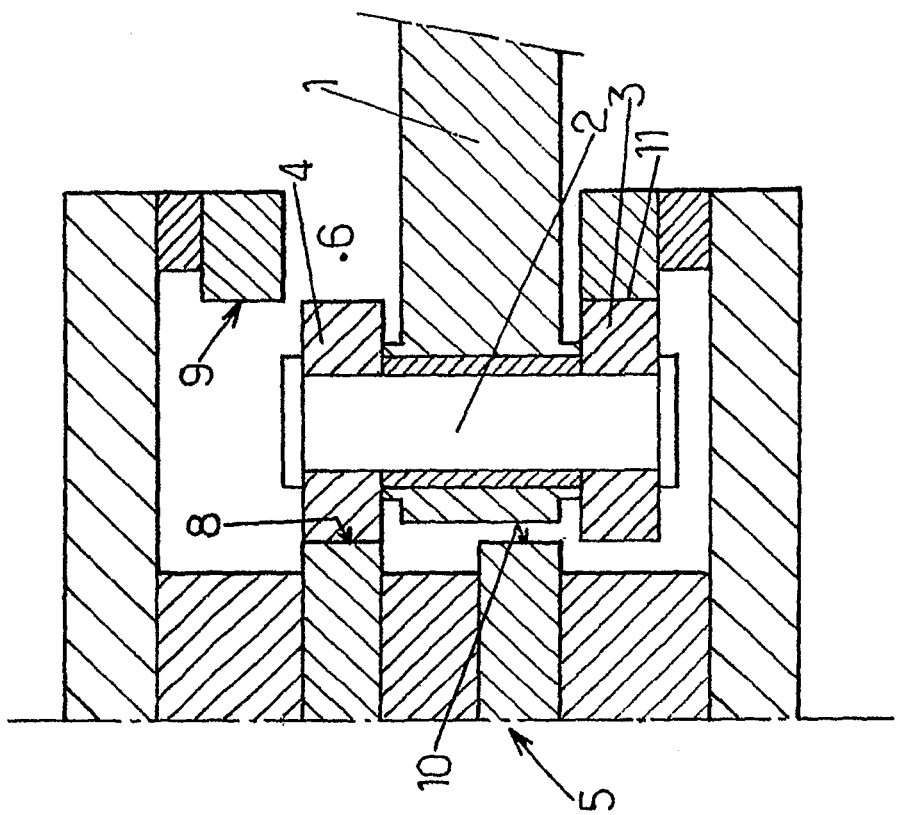
FIGS. 3 and 4 show in cross-section a roller carrier and a double pair of rollers according to a second embodiment of the invention.
Figure 3:
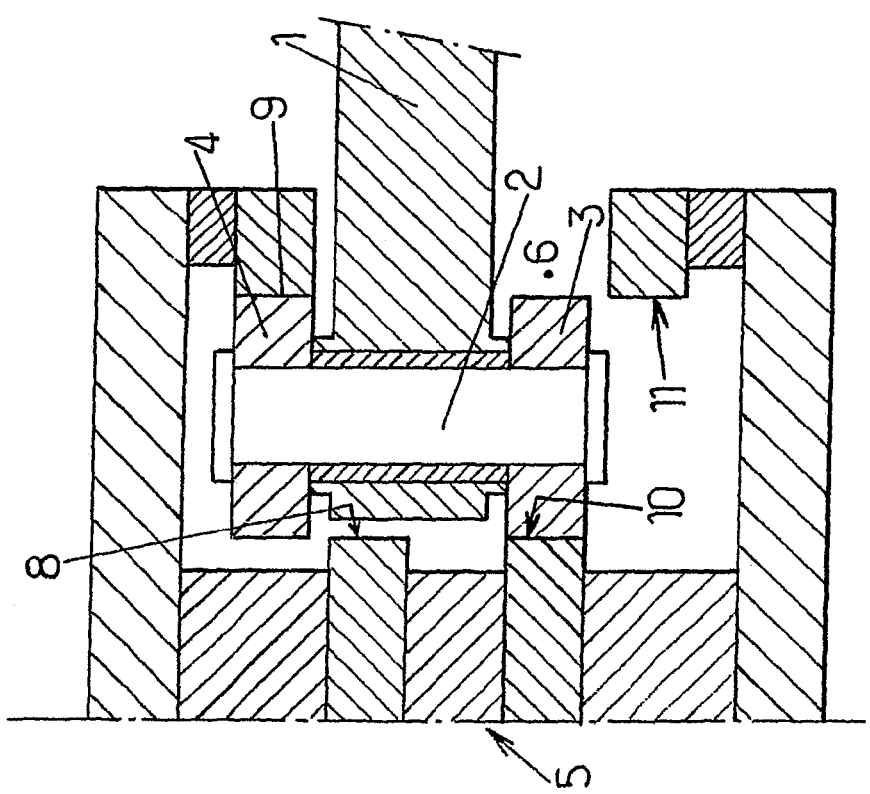

Reference is now made to FIGS. 3 and 4 that show a second embodiment.

In this second embodiment, the rigid assembly 5 is likewise formed by assembling together elements, only some of which define the cam paths. The advantages of this construction, as stated with reference to the embodiment of FIGS. 1 and 2, continue to apply and are therefore not restated.

In this embodiment, the assembly 5 forms a gutter with a side opening 6 into which the arm 1 carrying the shaft 2 supporting the rollers 3, 4 enters. As in the embodiment of FIGS. 1 and 2, the two rollers may be identical or different.

The shaft 2 can occupy two predetermined extreme positions. In one embodiment, the shaft 2 can be shifted and the assembly 5 is stationary.

In another embodiment, the shaft 2 has a fixed vertical position and the assembly 5 can be shifted. Relative displacement of the shaft 2 and the assembly 5 is performed between two positions by shifting up and down. The term "up and down" is used herein with reference to the orientation shown in FIGS. 3 and 4 and should not be understood as being limiting. In the first, "high" position (FIG. 3), a first roller 3 engages a first cam path 10. In the second, "low" position (FIG. 4), this first roller 3 engages a second cam path 11. In an embodiment, the device could include only this first roller 3 carried by the shaft 2 and engaging one or the other of the cam paths 10, 11. Nevertheless, in the embodiment shown, the shaft 2 carries a second roller 4. In the first, "high" position, this second roller 4 engages a third cam path 9. In the second, "low" position, this second roller 4 engages a fourth cam path 8.

The assembly 5 is put into place on the machine with the care that is usual for fastening a cam path on a machine (e.g. identifying positions with a comparator, making use of positioning pegs). Once the assembly has been put into place on the machine, it suffices to cause the roller-carrier shaft and the assembly 5 to move relative to each other when changing process, the shaft following the cam paths 9, 10 corresponding to a first process, or else following the paths 8, 11 corresponding to a second process that is independent of the first. This relative movement does not require any particular adjustment and can be performed quickly by personnel with relatively little training, or can be controlled by the operator.

Figure 6:
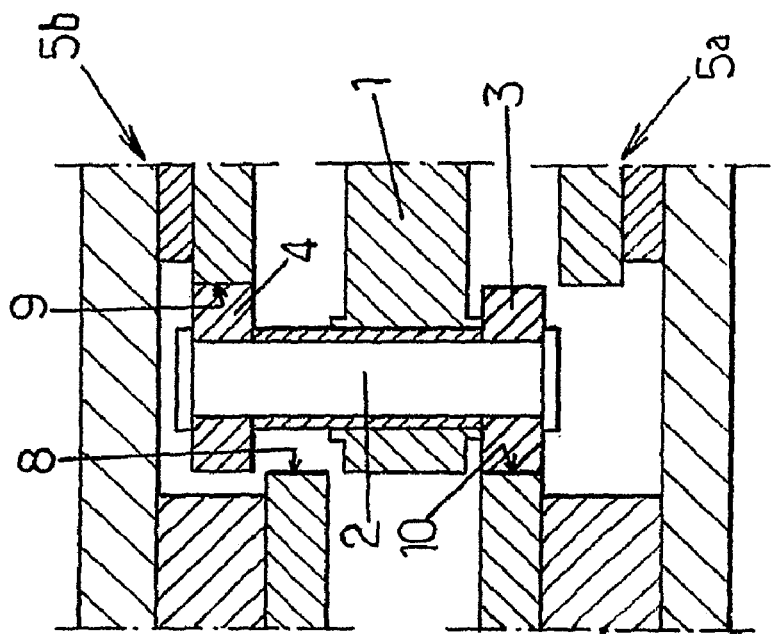
FIGS. 5 and 6 show in cross-section a roller carrier and a double pair of rollers according to a third embodiment of the invention.
Figure 5:
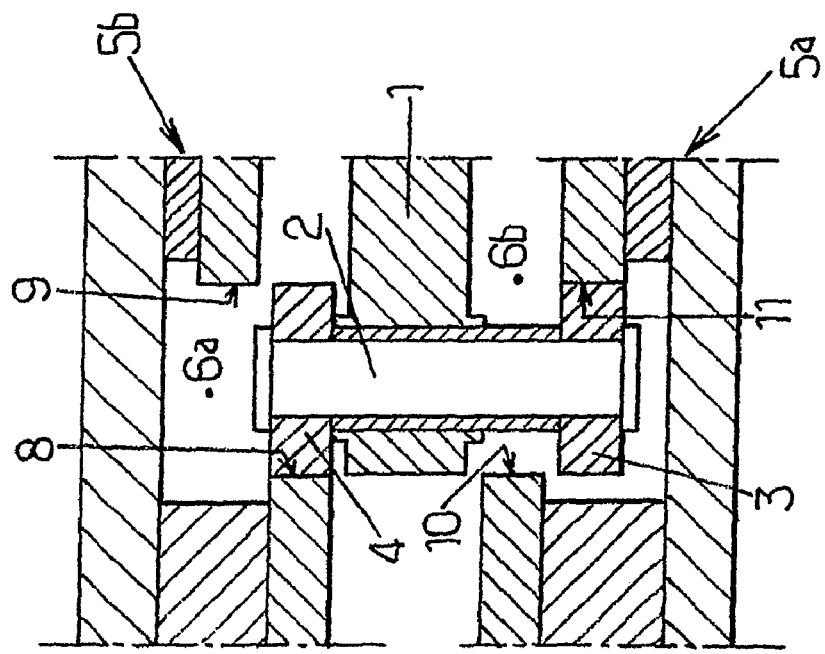

Reference is now made to FIGS. 5 and 6 which show a third embodiment.

In this third embodiment, two rigid assemblies 5a, 5b are each likewise formed by assembling together elements, only some of which define the cam paths. The advantages of this construction, set out with reference to the embodiment of FIGS. 1 and 2, continue to apply and are therefore not repeated.

In this embodiment, each assembly 5a, 5b forms a gutter with opening 6a, 6b facing each other.

Into each of these openings 6a, 6b, an end portion of an arm 1 carrying the shaft 2 supporting the rollers 3, 4 enters. As in the embodiment of FIGS. 1 and 2, the two rollers may be identical or different.

In one embodiment, the shaft 2 is movable and the assemblies 5a, 5b are stationary.

In another embodiment, the shaft 2 is stationary and the assemblies 5a, 5b are movable. By relative offsetting the shaft 2 and the assemblies 5a, 5b, the shaft 2 can occupy two predetermined extreme positions, by up/down movements between these two positions. The term "up/down" is used herein with reference to the orientation shown in FIGS. 5 and 6 and should not be seen as limiting. In the first, "high" position (FIG. 6), a first roller 3 engages a first cam path 10. In the second, "low" position (FIG. 5), this first roller 3 engages a second cam path 11.

In an embodiment, the device could have only this first roller 3 carried by the shaft 2 and engaging the one or the other of the cam paths 10, 11, with only the assembly 5a having these two cam paths being present. Nevertheless, in the embodiment shown, the shaft 2 carries a second roller 4. In the first, "high" position (FIG. 6), this second roller 4 engages a third cam path 9. In the second, "low" position (FIG. 5), this second roller 4 engages a fourth cam path 8.

The assemblies 5a, 5b are put into place on the machine with the care that is usual for fastening a cam path on a machine (e.g. identifying positions with a comparator, making use of positioning pegs). Once the assemblies have been put into place on the machine, it suffices to cause the roller-carrier shaft 2 and the subassemblies 5*a*, 5*b* to move relative to each other when modifying the process, the shaft 2 following the cam paths 9, 10 corresponding to a first process, or else following the cam paths 8, 11 corresponding to a second process that is independent of the first. This relative movement does not require any particular adjustment and can be performed quickly by personnel having relative little training, or can be controlled by the operator.

The arrangements described above with reference to the accompanying figures find advantageous applications in controlling the opening/closing of molds, in controlling the movement of a lengthening rod, in controlling the locking/unlocking of molds for carousel type blow-molding and stretch blow-molding machines.

They also find advantageous applications in controlling the movements of valves, in particular for opening and/or closing filling heads, or controlling the vertical movements of filling heads, or controlling the vertical movements of containers in carousel type filling machines.

The invention claimed is:

1. A control device, with a follower member and a cam path, to control an element of a container processing machine, comprising two cam paths defined by a single rigid assembly, means enabling a relative movement between the follower member and the rigid assembly, between at least two positions, the follower member engaging a first cam path in a first position, the follower member engaging a second cam path in a second position, wherein the follower member comprises two rollers carried by a common support shaft, the first and second rollers engaging respectively with first and second cam paths in a first position of the common support shaft relative to the rigid assembly, the first and second rollers engaging respectively with third and fourth cam paths in a second position of the shaft relative to the rigid assembly.

2. A device according to claim 1, wherein the rigid assembly defining the cam paths is stationary and the common support shaft is movable.

3. A device according to claim 1, wherein the rigid assembly defining the cam paths is movable and the common support shaft is stationary.

4. A device according to claim 1, characterized in that the rigid assembly is formed by assembling together segments carrying the cam paths for the follower member, and intermediate segments.

5. A device according to claim 1, wherein the rigid assembly has a general gutter shape, with a bottom wall and two flanges, each of the two flanges supporting at least one cam path.

6. A device according to claim 1, wherein it comprises two rigid assemblies, each having a gutter shape, the openings of these two rigid assemblies facing each other, each of the first and second rollers engaging a cam path of each rigid element, both in the first position and in the second position.

7. A device according to claim 1, wherein the rigid assembly has a gutter shape with a lateral opening, the rollers being mounted on a shaft on either side of an arm, that arm being mounted to move between a first extreme position in which the arm is closer to a first side edge of the opening of the gutter, and a second extreme position in which the arm is closer to a second side edge of the opening.

8. A device according to claim 1, wherein the rigid assembly has a gutter shape having an opening substantially perpendicular to the axis of rotation of the rollers, the roller support shaft being removably mounted on a support arm, a short first shaft ensuring that the first and second rollers engage respectively first and second cam paths of the rigid assembly, a long second shaft ensuring that the first and second rollers engage respectively third and fourth cam paths of the rigid assembly.

9. A device according to claim 1, wherein the follower member has two or more than two substantially identical rollers.

10. A blow-molding or stretch blow-molding machine for making containers out of thermoplastic material, including at least one device as set out in claim 1, in particular for controlling the movement of lengthening rods, or for controlling mold locking/unlocking, or for controlling mold opening/closing.

11. A machine for filling containers, including at least one device as set out in claim 1, in particular for controlling the opening and/or closing of filling members, or for controlling movements of filling heads, or for controlling movements of containers.

* * * * *